United States Patent
Erickson et al.

(10) Patent No.: US 8,070,076 B2
(45) Date of Patent: Dec. 6, 2011

(54) ARTICULATING FAUCET AND JOINT THEREFOR

(75) Inventors: Perry D. Erickson, Sheboygan, WI (US); Christopher M. Shay, Fredonia, WI (US)

(73) Assignee: Kohler Co., Kohler, WI (US)

( * ) Notice: Subject to any disclaimer, the term of this patent is extended or adjusted under 35 U.S.C. 154(b) by 97 days.

(21) Appl. No.: 12/405,975

(22) Filed: Mar. 17, 2009

(65) Prior Publication Data

US 2009/0242671 A1 Oct. 1, 2009

Related U.S. Application Data

(60) Provisional application No. 61/039,372, filed on Mar. 25, 2008.

(51) Int. Cl.
*B05B 15/08* (2006.01)

(52) U.S. Cl. ............... 239/587.2; 239/279; 239/280.5; 239/281; 239/587.5

(58) Field of Classification Search .............. 239/587.1, 239/587.2, 587.5, 587.6; 285/184, 279
See application file for complete search history.

(56) References Cited

U.S. PATENT DOCUMENTS

| | | |
|---|---|---|
| 856,427 A | 6/1907 | Schulz |
| 2,458,967 A | 1/1949 | Wiedenhoeft |
| 2,503,281 A | 4/1950 | Lynch et al. |
| 2,514,717 A | 7/1950 | Power |
| 3,064,998 A | 11/1962 | Syverson |
| 3,166,252 A | 1/1965 | O'Brien |
| 3,367,696 A | 2/1968 | Langley |
| 3,726,318 A | 4/1973 | Hyde |
| 4,592,388 A | 6/1986 | Wilcox |
| 5,014,749 A | 5/1991 | Humpert et al. |
| 5,040,729 A | 8/1991 | Carrozza |
| 5,056,562 A | 10/1991 | Pawelzik et al. |
| 5,290,074 A | 3/1994 | Chapman |
| 6,425,149 B1 | 7/2002 | Wang |
| 7,097,122 B1 | 8/2006 | Farley |
| 7,419,127 B2 | 9/2008 | Buehler |
| 2006/0180222 A1 | 8/2006 | Kang |
| 2007/0251590 A1 | 11/2007 | Weinstein |

FOREIGN PATENT DOCUMENTS

| | | |
|---|---|---|
| WO | WO 88/09896 | 12/1988 |
| WO | WO 2004/106651 | 12/2004 |

OTHER PUBLICATIONS

Eleven pages of a PCT Search Report in PCT/US2009/001840 dated Jul. 14, 2009, a corresponding PCT application.

*Primary Examiner* — Christopher Kim (74) *Attorney, Agent, or Firm* — Foley & Lardner LLP (57) ABSTRACT

Articulating faucets have segments connected by a plurality of movable joints. Each joint includes a pair of ceramic mating disks arranged in face to face contact, but able to rotate relative to each other when sufficient force is applied. A wave spring helps keep the disks in constant contact, and rubber spheres press against opposing surfaces of the ceramic disks to produce shear forces to keep the joint stable. In the faucet water passes through the joint by means of a tube or a hollow banjo bolt sealed from the joint. The faucet can therefore direct water to a wide variety of positions, without the need for a side spray, and while reducing the risk of joint leakage.

13 Claims, 7 Drawing Sheets

ARTICULATING FAUCET AND JOINT THEREFOR

CROSS-REFERENCE TO RELATED APPLICATION(S)

This application claims priority based on U.S. provisional application 61/039,372 filed on Mar. 25, 2008.

STATEMENT OF FEDERALLY SPONSORED RESEARCH OR DEVELOPMENT

Not applicable.

BACKGROUND OF THE INVENTION

The present invention relates to a plumbing fittings with connector assembly for coupling fluid conduits. More particularly it relates to a movable joint used to connect segments of an articulating faucet.

Bathroom lavatories and kitchen sinks typically have faucets positioned at the back deck thereof, or on the counter immediately behind the sink. Some, kitchen sinks in particular, may have relatively wide single basins, or may have multiple basins. Thus, it is often desirable for a faucet spout used therewith to be able to pivot so as to be able to direct water between multiple basins, or to a specific part of a wide basin. Even when a basin is not very large, it may be desirable to direct water to a pot or other item positioned in or near the basin, and pivoting spouts is the traditional solution for this need.

Pivoting faucets have been in use for many years and are quite commonly found in the kitchen of a home. Such faucets are characterized by having a connecting or coupling means for securing the spout to the faucet body while allowing the spout to be rotated during use.

Faucets incorporating movable joints are also known. For example, the HiRise™ kitchen pot filler introduced by the present assignee provides commercial-grade functionality in home kitchen settings. Articulating faucets, such as that disclosed in U.S. Pat. No. 6,425,149, are also known. Such jointed faucets enhance functionality and convenience by providing even greater flexibility in movement than standard pivoting faucets alone.

Jointed articulating faucets present challenges related to sealing between the movable connection of water carrying components as well as maintaining the stability of the faucet after it has been manipulated into one the desired position. The latter is event more challenging when providing the faucet with many, near infinite articulated positions.

Thus, an improved articulating faucet, and joint therefore, is desired that better addresses the aforementioned difficulties.

SUMMARY OF THE INVENTION

This invention provides an articulating faucet with a vertical support, a segmented faucet spout having at least two swing arms and a spray nozzle. A number of swivel joints connect the segments and enable them to be rotated and swiveled. Each swivel joint includes a pair of ceramic mating disks arranged face to face. The swivel joint includes a wave spring to maintain pressure against the disks to keep them in constant contact. The swivel joint further includes a number of rubber balls pressed against opposing surfaces of the ceramic disks to produce shear force causing the ceramic disks to move relative to each other. Water passes through the swivel joint by means of a tube that is sealed from the swivel joint.

Hence, when a segment of the faucet is rotated about a swivel joint, the segment can maintain its position against gravity, until moved again by another external force. Thus, the swivel joint provides a tight connection and resistance to rotation.

An internal hose or pipe (e.g. metallic such as copper or polymeric) may be used to carry the potable water through the segmented spout sections to minimize the water weight in the spout.

These and still other advantages of the invention will be apparent from the detailed description and drawings. What follows is merely a description of one preferred embodiment of the present invention. To assess the full scope of the invention the claims should be looked to as this preferred embodiment is not intended to be the only embodiment within the scope of the claims.

DETAILED DESCRIPTION OF THE PREFERRED EMBODIMENT(S)

Figure 1:
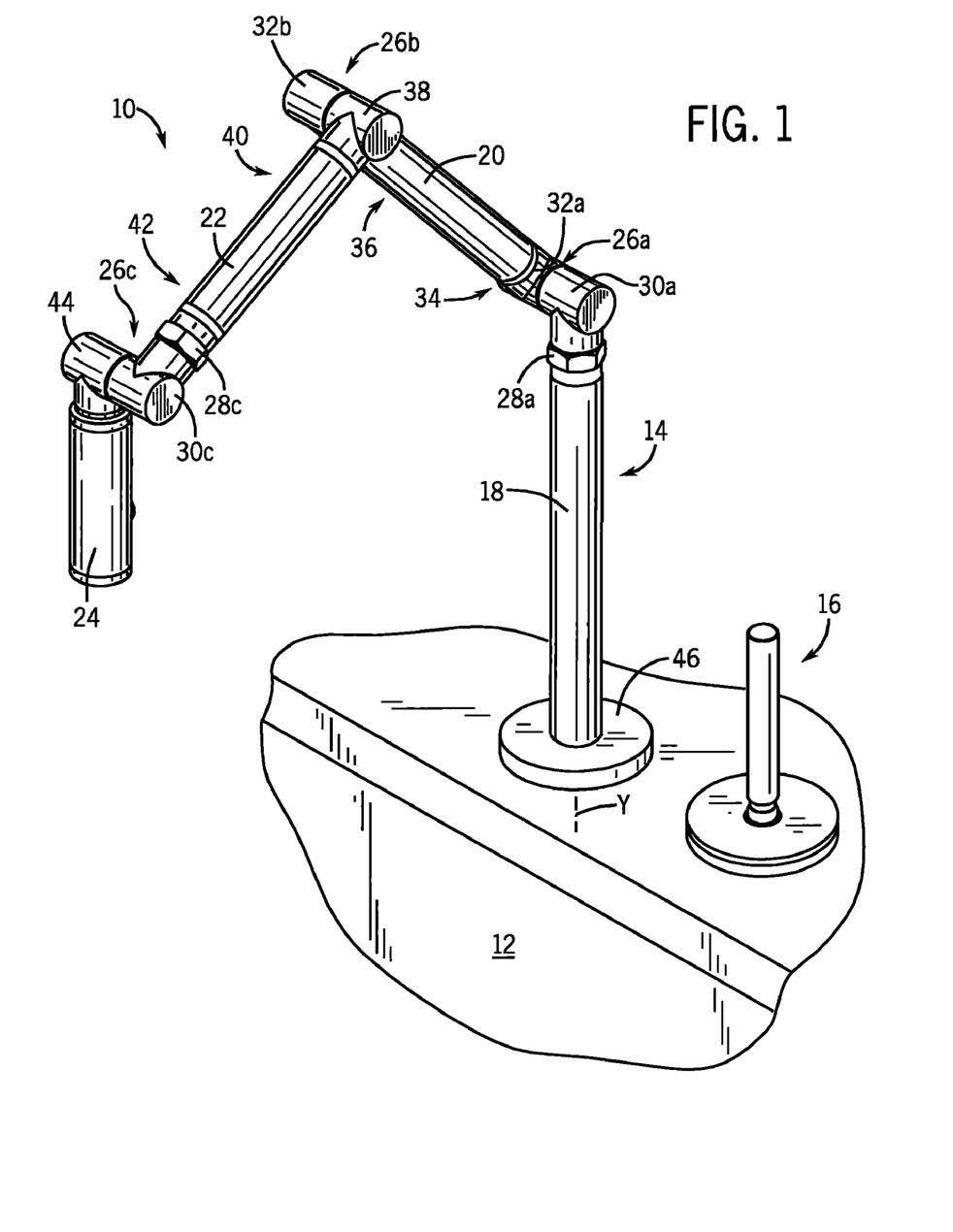
FIG. 1 is a perspective view of a faucet of the present invention.
Figure 2:
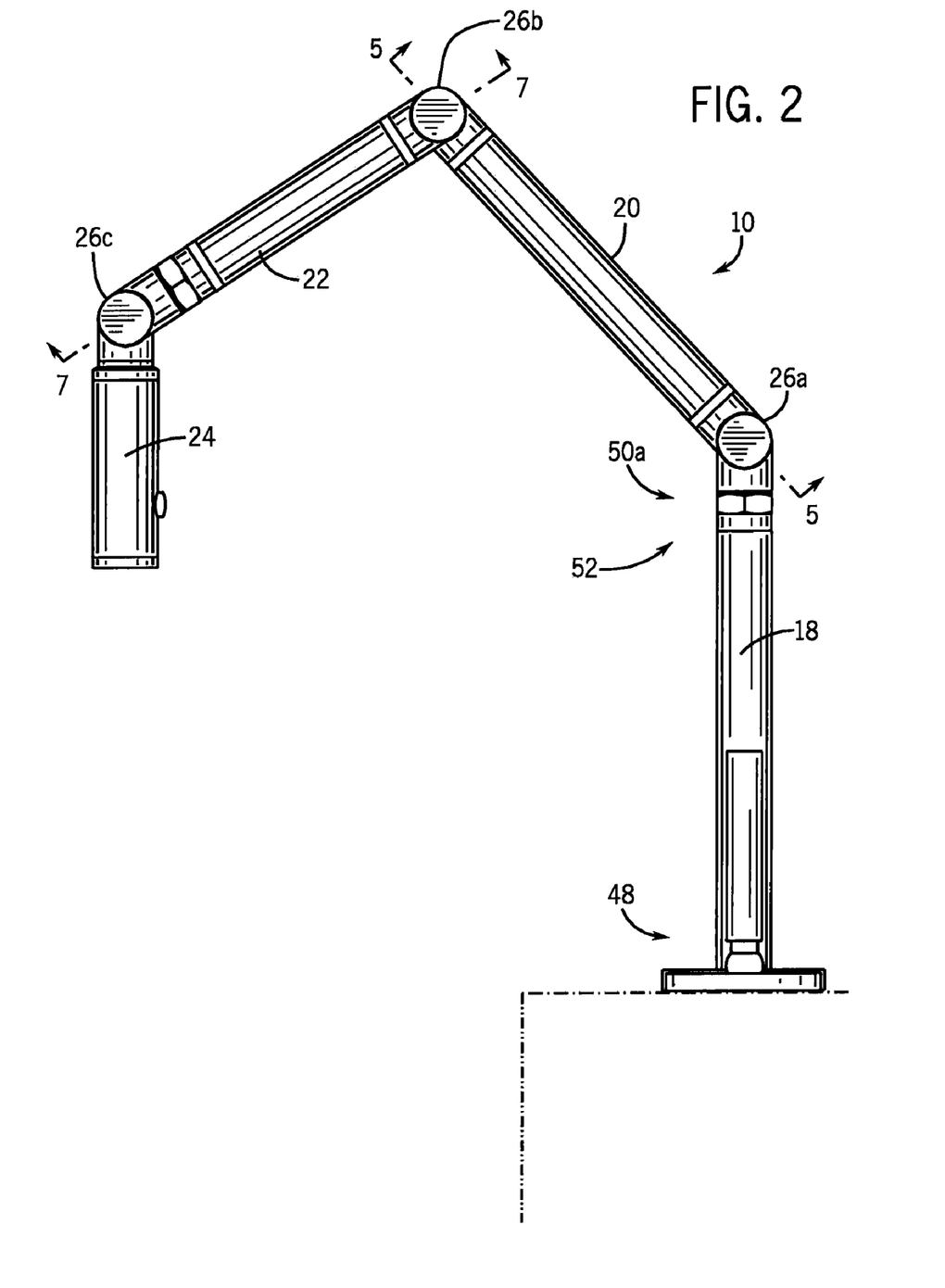
FIG. 2 is a side elevational view thereof.
Figure 3:
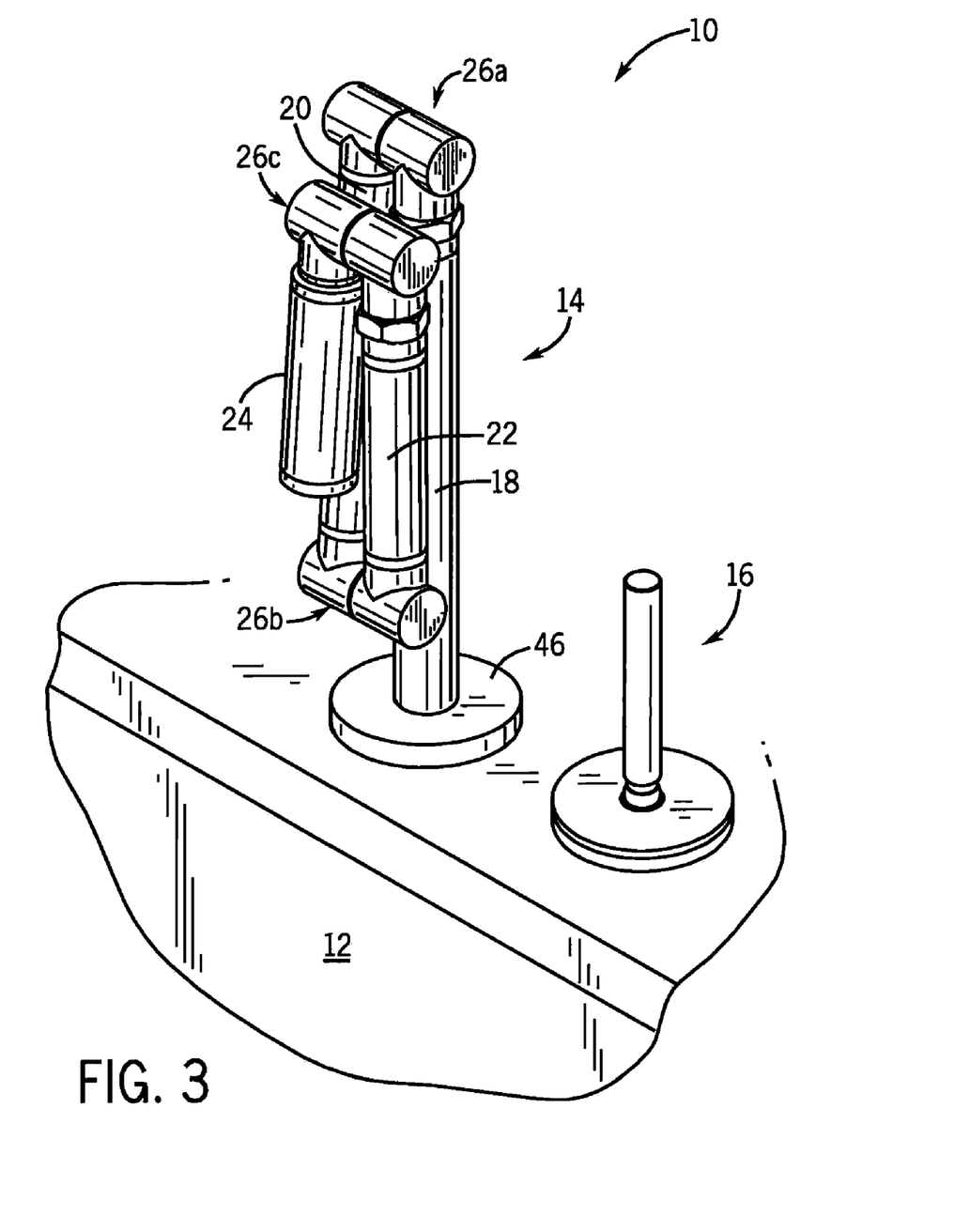
FIG. 3 is a perspective view of the faucet of FIG. 1 in a fully collapsed or retracted position.

FIGS. 1-3 illustrate an articulating faucet 10 suitable for use with a sink, lavatory, utility basin or other plumbing vessel, particularly those having a large basin, (e.g., a kitchen sink or other plumbing basin), such as basin 12. A tubular, segmented spout assembly 14 and a moveable faucet handle 16 can be mounted to either a mounting deck of the basin 12 or to a surrounding support surface (e.g., countertop, etc.). The spout assembly 14 includes a vertical support 18, two moveable swing arms 20, 22 and a spray head assembly 24. The spout assembly 14 further includes a number of joints 26A-C that enable pivoting of the swing arms 20, 22 and spray head assembly 24. Joints 26A and 26C each permit rotation about two axes, which lie in and provide movement in separate perpendicular planes. Joint 26B permits rotation around one axis. It should be noted that the distal joint 26C (adjacent the spray head assembly 24) is a floating joint in that its position in space can be shifted such that the axes, and resulting planes, of rotation are not fixed with respect to vertical or the horizon.

The vertical support 18 extends upwardly to the joint 26A situated between a swivel nut 28A and a swivel-side joint half 30A. The joint half 30A, and thus the swing arms 20, 22 and spray head assembly 24, may be swiveled clockwise or counterclockwise about an axis Y extending through the support 18. The joint 26A connects the swivel-side joint half 30A to a through-hole joint half 32A coupled to an upstream end 34 of the first swing arm 20. The downstream end 36 of the first swing arm 20 is also coupled to a through-hole joint half 32B which is further connected, via the intermediate joint 26B, to a pivot-side joint half 38 coupled to an upstream end 40 of the second swing arm 22. The downstream end 42 of the second swing arm 22 is coupled to a swivel nut 28C and further connected to a swivel-side joint half 30C via the distal joint 26C. The swivel-side joint half 30C is further connected to an outlet joint half 44 which is connected to the spray head assembly 24. Each joint 26A-C has the same basic design and operates in essentially the same way.

Because of the numerous pivot and swivel points provided by the joints 26A-C, the articulating faucet 10 can be manipulated into an almost limitless number of positions ranging from a partially extended normal use position shown in FIG. 1 to a fully retracted position shown in FIG. 3. The spray head assembly 24 is thus able to be manipulated in the horizontal "x" plane and vertical "y" plane obliquely extending planes therebetween, with simultaneous pivoting in multiple planes being possible. Further, the joints 26A-C retain the tubular segments in manipulated positions so as to enable a user to move the faucet into various arrangements and direct water from the spray head assembly 24 to various angular locations.

Though not shown but well known in the art, hot and cold water hoses extend from water supply valves to a mixing control valve. The handle 16 is tilted or otherwise moved to direct water to the articulating faucet 12 through a supply hose (not shown). The supply hose extends through an annular spout mounting assembly or base (generally 46 in FIG. 1) and is secured internally to the support 18 via a threaded connection.

The hollow vertical support 18 is fixedly connected to the remainder of the spout assembly 14 at a lower, upstream end 48 (see FIG. 2) and to a swivel joint assembly 50A at an upper end 52. The joint 26A of the present invention is provided between the swivel nut 28A and the swivel-side joint half 30A to enable the joint half 30A (and by extension, the entire articulating faucet 10) to be rotated clockwise or counterclockwise about axis Y of the vertical support 18. The first joint assembly 50A, and that for the intermediate joint 26B, are each nearly identical to the assembly 50C shown in FIGS. 6 and 7, and thus only one will be described in detail herein and as such the letter suffix of reference numerals 26, 28 and 30 will be left off in the following paragraphs, unless a particular joint is being referenced specifically.

Figure 6:
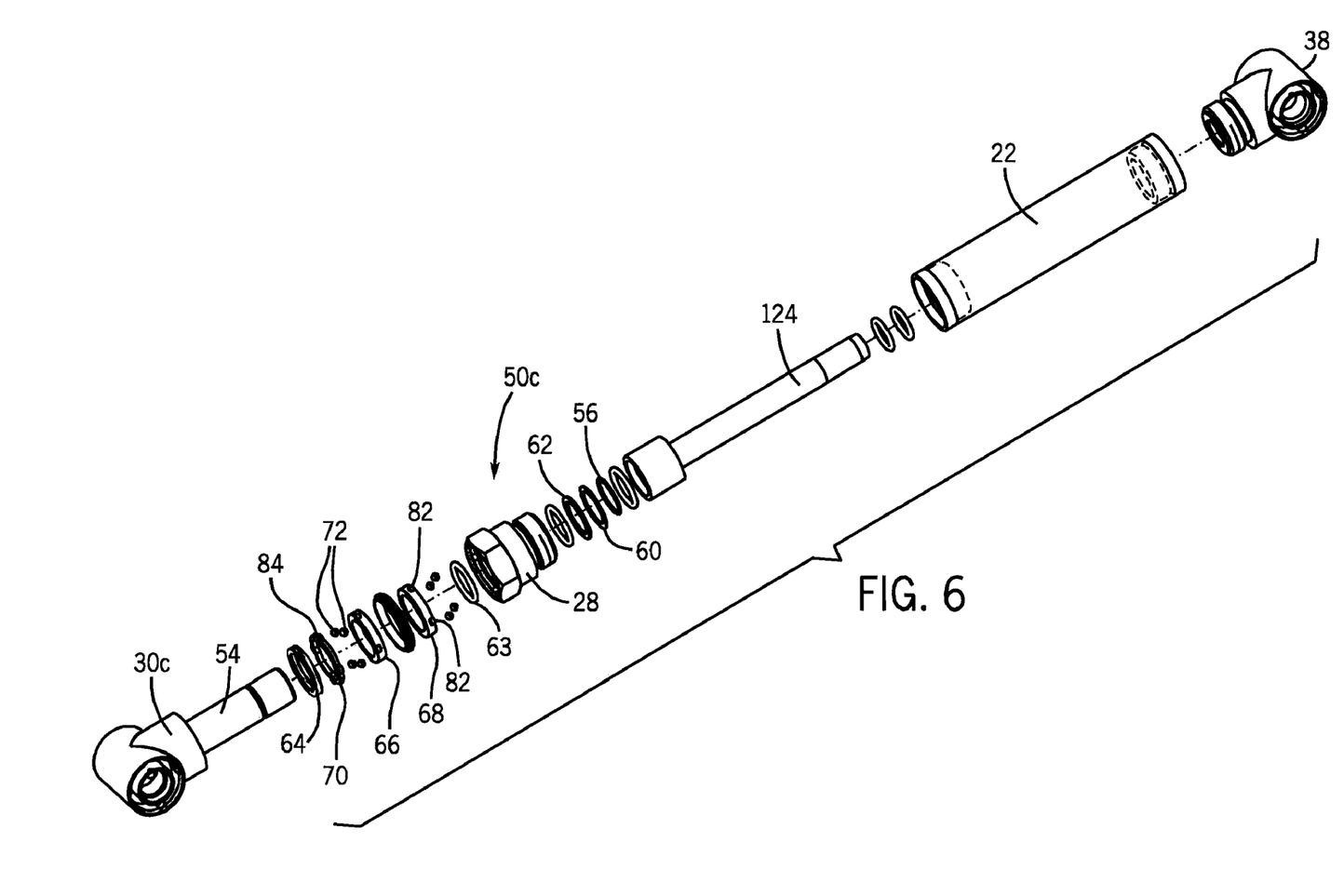
FIG. 6 is an exploded perspective view of another segment of the faucet of FIG. 1 connectable to the segment of FIG. 4.
Figures 7, 8:
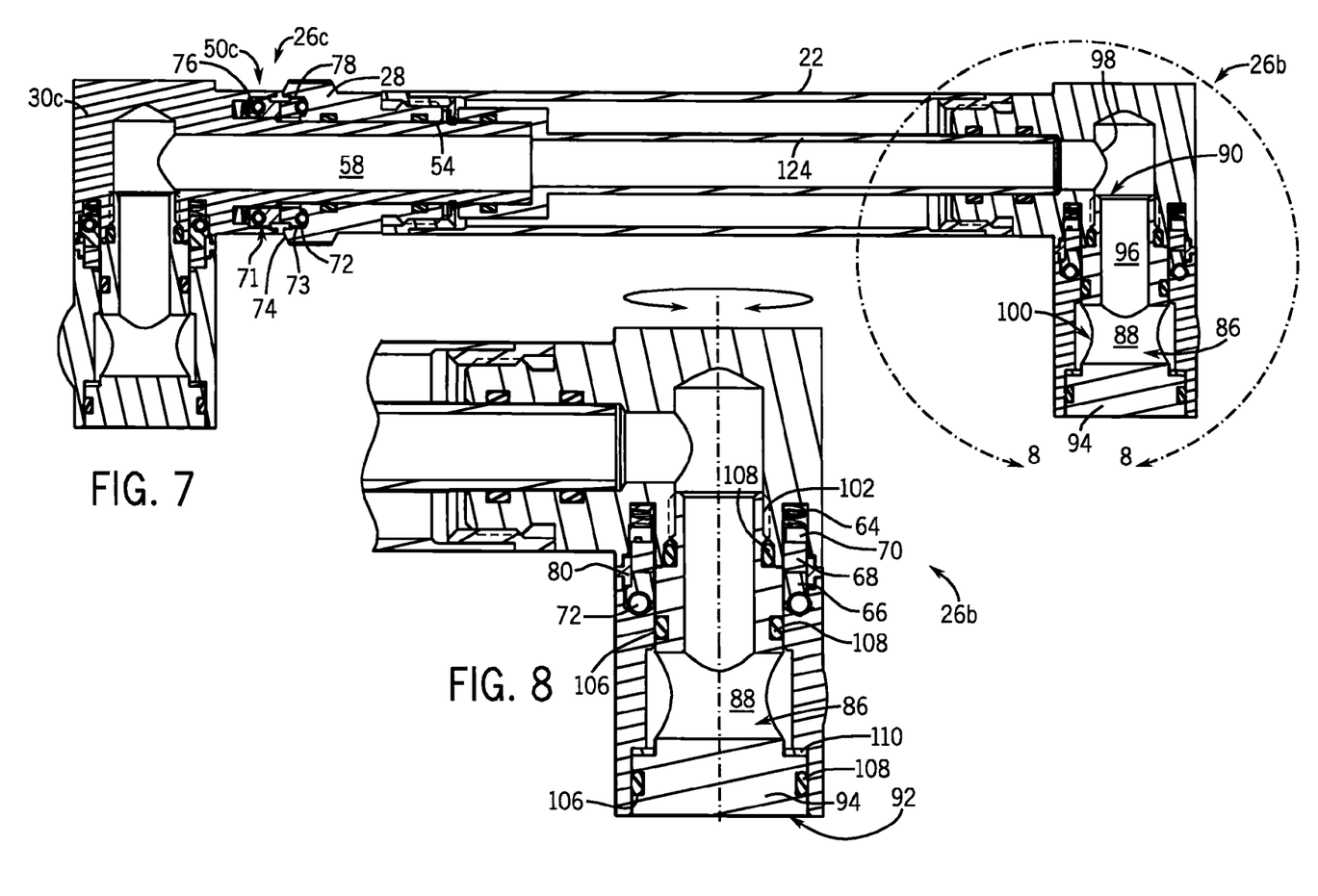
FIG. 7 is a detailed cross-sectional view taken along line 7-7 of FIG. 2.
FIG. 8 is a partial enlarged view taken along the arc 8-8 of FIG. 7.

With reference to FIGS. 6 and 7, the swivel joint assembly 50C includes the swivel nut 28 and swivel-side joint half 30. The swivel-side joint half 30 includes a cylindrical post 54 extending through the swivel nut 28. A retaining washer 56 secures the swivel nut 28 in a position radially outward from the cylindrical post 54.

With regard to joint 26A shown in FIGS. 1 and 2, a portion of the swivel nut 28A is inserted into the upper end of the vertical support 18 and sealed with an o-ring. The post section of the swivel nut 28A has an axial bore, similar to passage 58 shown in FIG. 7, extending therethrough to direct water from vertical support 18 and into the body of the swivel-side joint half 30A. Although contemplated, no interior tube is used in the vertical support 18 as additional weight from water in the full volume of the support 18 is not an issue.

Returning to FIGS. 6 and 7, the swivel nut assembly 50C further includes the aforementioned retaining washer 56 as well as a silicone washer 60, a swivel friction washer 62 and an o-ring 63. A spirawave spring 64, a pair of lobed ceramic disks 66, 68, an injection molded ball ring 70, and a number of rubber balls 72. These components are located radially outward from the cylindrical post 54. The components are sandwiched together within a cavity 71 defined by an annular groove 73 located in an upper surface 74 of the swivel nut 28 and a corresponding annular groove 76 located in an annular shoulder 78 of the swivel-side joint half 30. The swivel joint 26 is isolated from water passing therethrough by virtue of the cylindrical extension and o-rings.

Within the swivel joint 26, the ceramic disks 66, 68 are placed together in a face to face arrangement. The wave spring 64 applies a constant force against the components, including the ceramic disks 66, 68. A series of deformable bearings, such as rubber spheres or balls 72, provide resistance between the disks 66, 68 and the respective grooves 73, 76. A friction washer 80 is located radially outward from the disks 66, 68 and between the swivel nut 28 and joint half 30 to prevent metal to metal contact and facilitate a swiveling motion.

The force applied against the disks 66, 68 by the wave spring 64, along with intermolecular, i.e., van der Waals, forces therebetween enable the disks 66, 68 to resist rotation and prevent movement of the joint 26 unless overcome by an external turning force. When a sufficient turning force is applied, the disks 66, 68, being fixed relative to their respective grooves 73, 76, move relative to each other.

Due to manufacturing tolerances, the outer diameter of any lobed ceramic disk 66 is not the same as the inner diameter of the receiving cavity 70 so as to be retained via a friction fit. Instead, there is a gap, which results in some amount of play between the lobes 82 of the disks 66, 68 and the inner surface of the cavity 70. When the gap is sufficiently large, the ceramic disks 66, 68 do not move with respect to each other when the joint 26 is moved. Instead, the disks 66, 68 rotate together, causing the swivel joint 26 to return to a previous position after the external turning force has stopped. The aforementioned rubber balls 72 produce shear forces via compression that cause the disks 66, 68 to rotate with their associated joint half and not together.

As alluded to, the ceramic disks 66, 68 are formed with a number of anti-rotation lobes 82. A cone-shaped cutout (not shown) is formed in each lobe 82, within which a rubber ball 72 is placed. Ball-receiving cavities (not shown) are also formed in the annular groove 73 of the disk 68 in a pattern matching the lobes 82. When the joint 26 is assembled, the rubber balls 72 are compressed between the disc 68 and the annular groove 73 and produce the shear forces as needed.

Because the wave spring 64 is pressed directly against the annular groove 70 of the swivel-side joint half 30, no ball-receiving cavities are formed therein. Instead, the injection molded ball ring 70 is provided. The ball ring 70 is also formed with a number of lobes 84, each of which having a ball-receiving cavity (not shown). When the swivel joint 26 is assembled, the rubber balls 72 are fixedly secured between the ceramic disc 66 and ball ring 70 to produce shear forces when the swivel joint 26 is operated. When compressed, the ball ring 70 is deformed such that an outward force is applied to the inner surface of the receiving groove 76, further helping to prevent rotation of the ceramic disc 66. When the swivel joint 26 is operated, the balls 72 are subjected to shear forces, causing the associated ceramic disk 66, 68 to move, or not move, with the joint half 30 or swivel nut 28, respectively.

As mentioned above, at the first joint 26A, the swivel-side joint half 30 is also coupled to the through-hole joint half 32A, and at the intermediate joint 26B the pivot-side joint half 38 is coupled to the through-hole joint half 38. A hollow banjo bolt 86 defines a passage 88 for water passing through the joint and further secures the joint halves together as further discussed below.

The banjo bolt 86 has an axially extending upstream end 90 and a downstream end 92 adjacent a bolt head 94. The bolt 86 is formed with an throughbore 96 extending from an inlet 98 axially located at the upstream end 90 and a cross-drilled outlet 100 formed near the downstream end 92. The banjo bolt 86 has a series of threads 102 that enable the bolt 86 to be fixedly secured to the swivel-side joint half 30 via internal threads contained therein. Pin holes 104 located in the head 94 are used to drive the banjo bolt 86 through the through-hole joint half 32 and into the pivot-side joint half 38. When the bolt 86 is driven into the joint half 38, the wave spring 64 is compressed such that the resistive forces between the ceramic disks 66, 68 becomes harder to overcome. In other words, the joint requires more external force to move as the bolt 86 is driven in further.

The outer surface of the banjo bolt 86 further has a series of annular grooves 106 designed to receive o-rings 108. The o-rings 108 seal the outer surface of the bolt 86 against the inner surfaces of the joint halves to isolate the inlet 98 from the outlet 100 and keep the water in the bore 88 of the banjo bolt 86. The through-hole joint half 32 may be rotated about the banjo bolt 86 while maintaining fluid communication with the mating joint half. A silicone washer 110 between the bolt head 94 and the through-hole joint half 38 prevents metal to metal contact when the through-hole joint half 38 is rotated.

Figure 4:
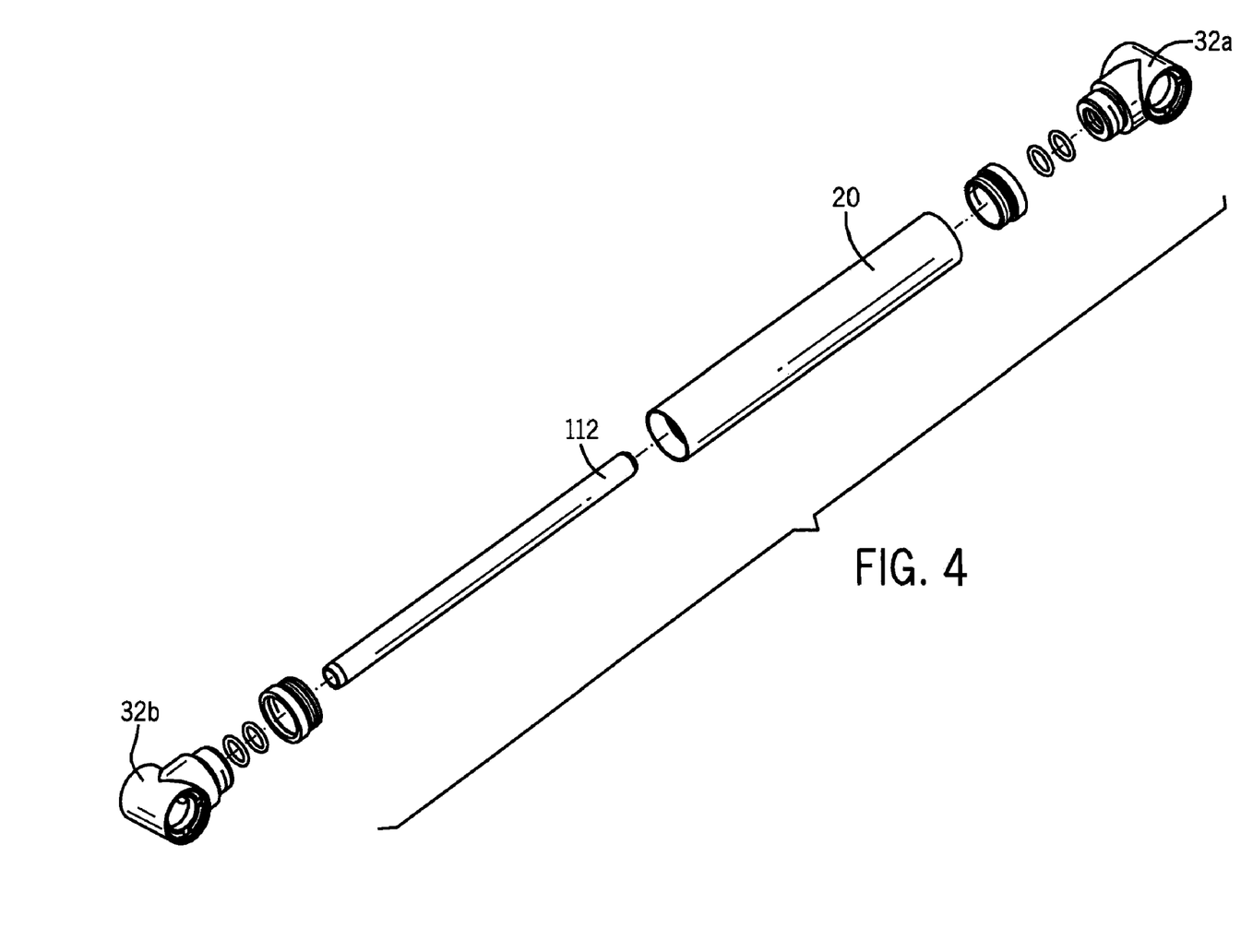
FIG. 4 is an exploded perspective view of one segment of the faucet of FIG. 1.
Figure 5:
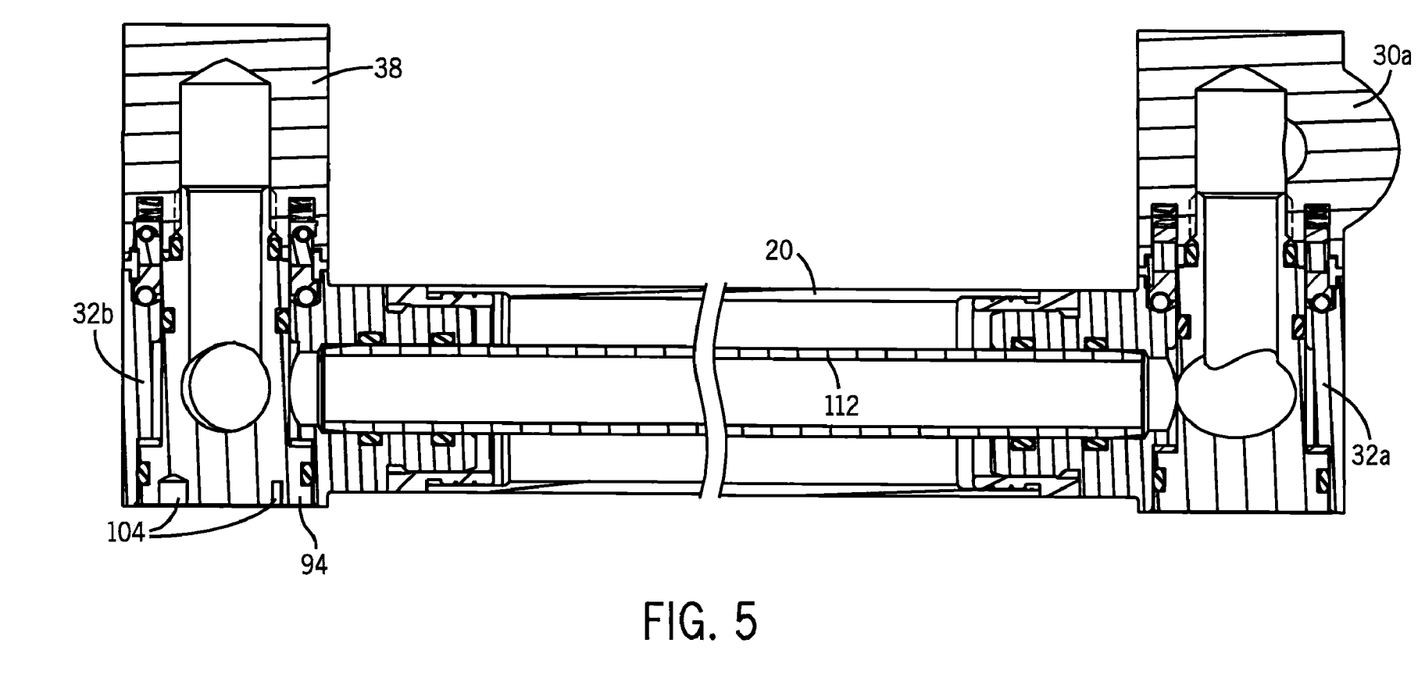
FIG. 5 is a cross-sectional view taken along line 5-5 of FIG. 2.

Referring to FIGS. 4 and 5, the first swing arm 20 includes an internal tube 112 secured between two through-hole joint halves 32A, 32B. Water is carried within the tube 122 to limit the amount of water, and thus the weight, in the first swing arm 20. As previously discussed, the water passes through the through-hole joint half 32B and a pivot-side joint half 38 and into a second internal tube 124 extending inside of the second swing arm 22. The downstream end 42 of the second swing arm 22 includes a swivel nut 28C and a swivel-side joint half 30C as previously discussed. The swivel-side joint half 30C is connected to an outlet joint half 44 via the joint 26C. The spray head assembly 24 is fixedly secured to the outlet joint half 44 via a set screw (not shown).

The outer surfaces of the spout segments may be made of composites such as Texalium/carbon fiber or other non-metal materials such as plastics, wood, glass, and the like. The use of such materials further minimizes the overall weight of the spout while also providing decorative features such as a clear, colored or translucent appearance.

Those skilled in the art will understand and appreciate that various parts and components conventional in water faucet construction may be employed to provide for sealing, rotation, assembly, and fastening of the various assemblies and subassemblies of the present invention. Parts that are typically employed include o-rings and/or gaskets for sealing, various fastening elements such as nuts, threaded fasteners, washers, and the like, set screws to fix the position of the nozzle head, and so on.

Thus, the present invention provides an articulating faucet with multiple segment swiveling capability. It should be appreciated that a preferred embodiment of the invention has been described above. However, many modifications and variations to this preferred embodiment will be apparent to those skilled in the art, which will be within the spirit and scope of the invention.

Therefore, the invention should not be limited to just the specifically described embodiments. To ascertain the full scope of the invention, the following claims should be referenced.

INDUSTRIAL APPLICABILITY

The invention provides articulating faucets, and joints therefor, allowing segments and a spray head thereof to be manipulated and held in numerous orientations.

What is claimed is:

1. An articulating faucet comprising:
   a vertical support;
   a plurality of swing arms;
   a spray head; and
   a plurality of joints interconnecting the spray head to the support via the swing arms and allowing for movement of the spray head with respect to the support, wherein the plurality of joints effect internal rotational resistance such that the spray head is maintained in a fixed position until at least one of the plurality of joints is overcome by an external force other than gravity;
   at least one of the joints comprising:
      first and second joint parts rotatable with respect to one another and configured to allow fluid to pass from the first joint part to the second joint part;
      first and second disk friction members, the first disk friction member being associated with the first joint part and the second disk friction member being associated with the second joint part, the first and second disk friction members being matable in face to face relation; and
      a spring member applying a force biasing the disk friction members in contact with one another such that the first and second disk friction members maintain a relative position of the first and second joint parts up to a threshold rotational force.

2. The articulating faucet of claim 1, wherein the disk friction members are ceramic disks.

3. The articulating faucet of claim 2, wherein the disks having lobes with a ball-receiving cavity and the articulating faucet further comprising:
   a ball ring; and
   a plurality of rubber balls secured between the ball-receiving cavity and the ball ring;
   wherein the spring, disks, ball ring, and rubber balls are sandwiched together in a swivel joint cavity.

4. The articulating faucet of claim 3, the rubber balls are compressible.

5. The articulating faucet of claim 1 wherein the plurality of swing arms provide a pathway for the water.

6. The articulating faucet of claim 1 wherein the spray head comprises an outlet head for receiving water from the swing arms.

7. The articulating faucet of claim 1 wherein the spray head that can be directed to varied positions.

8. The articulating faucet of claim 1, wherein the spring member is a wave spring.

9. The articulating faucet of claim 1, further comprising a tube extending through a swing arm.

10. The articulating faucet of claim 1, wherein a joint is configured such that a rotational force can move swing arms relative to one another, but that upon removal of that force the swing arms can return automatically to their previous position.

11. The articulating faucet of claim 1, further comprising a bolt that assists in holding the swing arms together.

12. The articulating faucet of claim 11, wherein the bolt is a hollow banjo bolt.

13. The articulating faucet of claim 12, wherein the banjo bolt has a threaded portion.

* * * * *